(12) United States Patent
Dai et al.

(10) Patent No.: US 11,286,174 B2
(45) Date of Patent: Mar. 29, 2022

(54) SYSTEM FOR SUPPLYING HEAT BY MEANS OF STRATUM COAL IN-PLACE SLURRYING AND METHOD FOR SUPPLYING POWER GENERATION HEAT BY MEANS OF STRATUM COAL IN-PLACE SLURRYING

(71) Applicant: ZHEJIANG LUTE ENERGY TECHNOLOGY CO., LTD, Zhejiang (CN)

(72) Inventors: Boqing Dai, Zhejiang (CN); Jinjin Qiao, Zhejiang (CN); Yaping Wang, Zhejiang (CN)

(73) Assignee: ZHEJIANG LUTE ENERGY TECHNOLOGY CO., LTD, Zhejiang (CN)

( * ) Notice: Subject to any disclaimer, the term of this patent is extended or adjusted under 35 U.S.C. 154(b) by 0 days.

(21) Appl. No.: 16/632,130

(22) PCT Filed: Aug. 17, 2017

(86) PCT No.: PCT/CN2017/097850
§ 371 (c)(1),
(2) Date: Jan. 17, 2020

(87) PCT Pub. No.: WO2019/015002
PCT Pub. Date: Jan. 24, 2019

(65) Prior Publication Data
US 2020/0223714 A1    Jul. 16, 2020

(30) Foreign Application Priority Data
Jul. 17, 2017  (CN) .......................... 201710580940.6

(51) Int. Cl.
*C02F 1/00*    (2006.01)
*B01F 3/06*    (2006.01)
(Continued)

(52) U.S. Cl.
CPC .............. *C02F 1/004* (2013.01); *B01F 3/068* (2013.01); *B01F 3/1271* (2013.01); *F01D 15/10* (2013.01);
(Continued)

(58) Field of Classification Search
None
See application file for complete search history.

(56) References Cited

U.S. PATENT DOCUMENTS

| 4,602,483 A | 7/1986 | Wilks et al. |
| 2003/0178191 A1* | 9/2003 | Maher .................. E21B 36/001 166/65.1 |

(Continued)

FOREIGN PATENT DOCUMENTS

| CN | 1048528 | 1/1991 |
| CN | 105157010 | 12/2015 |

(Continued)

OTHER PUBLICATIONS

International Search Report, issued in the corresponding PCT application No. PCT/CN2017/097850, dated Apr. 20, 2018, 7 pages.

*Primary Examiner* — Richard C Gurtowski
(74) *Attorney, Agent, or Firm* — Hamre, Schumann, Mueller & Larson, P.C.

(57) ABSTRACT

The present invention provides a system for supplying heat by means of stratum coal in-place slurrying and a method for supplying power generation heat by means of stratum coal in-place slurrying, belonging to the technical field of ground-source well heat exchange. The system comprises a stratum coal slurrying device, a mid-deep well casing device and a heat exchange device. The stratum coal slurrying device comprises a water inlet pump and a coal slurry pump, which are connected to a directional slurry preparing drill through pipelines, respectively. The mid-deep well casing device comprises a vertically buried pipe, and a heat-
(Continued)

insulating inner pipe that is coaxial with the vertically buried pipe and inserted into the vertically buried pipe. A microporous pipe assembly is arranged on the bottom of the heat-insulating inner pipe. An electric heater is arranged in the microporous pipe assembly, an annular cavity is formed between the vertically buried pipe and the heat-insulating inner pipe, and a power wire connected to the electric heater is arranged in the annular cavity. The coal slurry pump is connected to the annular cavity. The heat exchange device comprises a water outlet pipe that is inserted into the heat-insulating inner pipe and connected to the microporous pipe assembly. The present invention can directly combust the underground coal to generate heat energy to realize heat energy conversion, and the process is clean and harmless.

10 Claims, 6 Drawing Sheets

(51) Int. Cl.
  *B01F 3/12*   (2006.01)
  *F01D 15/10*  (2006.01)
  *F01K 17/02*  (2006.01)
  *C02F 103/10* (2006.01)
  *E21B 36/04*  (2006.01)
(52) U.S. Cl.
  CPC .... *F01K 17/025* (2013.01); *B01F 2215/0081* (2013.01); *C02F 2103/10* (2013.01); *E21B 36/04* (2013.01)

(56) References Cited

U.S. PATENT DOCUMENTS

2010/0155070 A1* 6/2010 Roes ................ E21B 44/02
                                              166/302
2015/0218971 A1  8/2015 Harada et al.

FOREIGN PATENT DOCUMENTS

| CN | 105604618  | 5/2016  |
| CN | 207064026  | 3/2018  |
| JP | 2011-214809 | 10/2011 |
| JP | 473732     | 4/2014  |

* cited by examiner

SYSTEM FOR SUPPLYING HEAT BY MEANS OF STRATUM COAL IN-PLACE SLURRYING AND METHOD FOR SUPPLYING POWER GENERATION HEAT BY MEANS OF STRATUM COAL IN-PLACE SLURRYING

TECHNICAL FIELD OF THE INVENTION

The present invention belongs to the technical field of ground-source well heat exchange, and relates to a system for supplying heat by means of stratum coal in-place slurrying and a method for supplying power generation heat by means of stratum coal in-place slurrying.

BACKGROUND OF THE INVENTION

The conventional way to supply heat and generate power by coal combustion is as follows. In a first step, the stratum coal is extracted by coal mining. During this step, various problems such as water permeation/gas explosion/ground collapse/water pollution will be caused. In a second step, the coal is combusted by a boiler device to heat water to generate steam for power generation and heat supply. During this step, problems such as the emission of dust/sulfide/NO compounds and high cost for purification are caused, and the emission of $CO_2$ and fly ash cannot be eliminated easily. Therefore, the problems of air pollution and carbon emission caused by coal combustion have become prominent environmental problems.

In addition, the air pollution problem, caused by the thermochemical process during coal combustion, can be solved by supercritical hydrothermal combustion. However, the cost/pollution/explosion risk during the conventional stratum coal mining is not eliminated.

SUMMARY OF THE INVENTION

In view of the above problems, an objective of the present invention is to provide a system for supplying heat by means of stratum coal in-place slurrying.

Another objective of the present invention is to provide a method for supplying power generation heat by means of stratum coal in-place slurrying.

For those purposes, the present invention employs the following technical solutions.

A system for supplying heat by means of stratum coal in-place slurrying is provided, including a stratum coal slurrying device, a mid-deep well casing device and a heat exchange device;

the stratum coal slurrying device includes a water inlet pump and a coal slurry pump, which are connected to a directional slurry preparing drill through pipelines, respectively;

the mid-deep well casing device includes a vertically buried pipe and a heat-insulating inner pipe that is coaxial with the vertically buried pipe and inserted into the vertically buried pipe, with a microporous pipe assembly being arranged on the bottom of the heat-insulating inner pipe, electric heaters being arranged in the microporous pipe assembly, an annular cavity being formed between the vertically buried pipe and the heat-insulating inner pipe, a power wire connected to the electric heaters being arranged in the annular cavity, and the coal slurry pump being connected to the annular cavity; and the heat exchange device includes a water outlet pipe that is inserted into the heat-insulating inner pipe and connected to the microporous pipe assembly, and the water outlet pipe is connected to a heat exchanger.

In the system for supplying heat by means of stratum coal in-place slurrying, the microporous pipe assembly includes a first microporous pipe and a second microporous pipe that are coaxial with each other, and the electric heaters are arranged in the first microporous pipe and the second microporous pipe, respectively.

In the system for supplying heat by means of stratum coal in-place slurrying, both the first microporous pipe and the second microporous pipe are microporous ceramic pipes; a water inlet pipe connected to the first microporous pipe is arranged in the annular cavity between the vertically buried pipe and the heat-insulating inner pipe; the system further includes a composite single-wall pipe, two ends of which are hermetically connected to the top of the second microporous pipe and the bottom of the heat-insulating inner pipe, respectively; and, the top of the heat-insulating inner pipe is hermetically connected to the water outlet pipe.

In the system for supplying heat by means of stratum coal in-place slurrying, the heat exchanger is connected to a power generation device; the power generation device includes a steam turbine connected to the heat exchanger; the steam turbine is connected to a power generator; the power generator is connected to a variable power distribution cabinet; the variable power distribution cabinet is connected to a municipal power grid and a power wire, respectively; the steam turbine is further connected to a cooler; a circulating cooling pipeline is arranged in the cooler; and, the cooler is connected to the heat exchanger through a working medium water circulating pump.

In the system for supplying heat by means of stratum coal in-place slurrying, the heat exchanger is also connected to a slag-water purification, filtration and separation device; the slag-water purification, filtration and separation device includes a water purification filter connected to the heat exchanger; a slag extractor and a slag pool are arranged on the bottom of the water purification filter; and, a water outlet of the water purification filter is connected to the water inlet pump.

In the system for supplying heat by means of stratum coal in-place slurrying, the top of the water purification filter is connected to a pressure-stabilized gas distributor through a pipeline; the pressure-stabilized gas distributor is connected to a coal slurry pump and a gas compressor; the gas compressor is connected to a $CO_2$ tank; the $CO_2$ tank is connected to a gas-solid mixer through a liquid conveying pump; the slag pool is connected to the gas-solid mixer through a slag conveying pump; the gas-solid mixer is connected to a slag liquid backfilling device; and, the slag liquid backfilling device includes a vertical slag liquid conveying pipe connected to the gas-solid mixer and a directional slag discharge portion connected to the vertical slag liquid conveying pipe.

In the system for supplying heat by means of stratum coal in-place slurrying, a plastic capsule making machine is arranged between the liquid conveying pump and the gas-solid mixer, and a vertically buried sleeve is sheathed outside the vertical slag liquid conveying pipe.

In the system for supplying heat by means of stratum coal in-place slurrying, wherein a gas heat exchanger is arranged between the gas compressor and the $CO_2$ tank; the water inlet pump is also connected to a water inlet of the gas heat exchanger; and, a water outlet of the gas heat exchanger is connected to an outlet of the water inlet pump.

In the system for supplying heat by means of stratum coal in-place slurrying, the outlet of the water inlet pump is also connected to a natural gas mixer, and the natural gas mixer is connected to the water inlet pipe.

A method for supplying power generation heat by means of stratum coal in-place slurrying by using the system for supplying heat by means of stratum coal in-place slurrying described above is provided, including: a step of in-place preparing slurry by a stratum coal slurrying device, a step of combusting coal slurry by a mid-deep well casing device, and a step of exchanging heat and generating power by a heat exchange device, wherein:

in the step of in-place preparing slurry by the stratum coal slurrying device, water is conveyed to a directional slurry preparing drill by a water inlet pump, coal in a stratum coal storage area is cut and grinded into coal slurry having a particle size of 100 to 200 μm by the directional slurry preparing drill, and the coal slurry is conveyed to the ground surface by a coal slurry pump;

in the step of combusting coal slurry by the mid-deep well casing device, the coal slurry having particle size of 100 to 200 μm is injected into an annular cavity between a vertically buried pipe and a heat-insulating inner pipe, electric heaters heat a microporous pipe assembly to raise the temperature of water near the microporous pipe assembly to above 400° C. so that the coal slurry undergoes thermal oxidation reaction, the coal slurry is continuously fed, and the reacted hot water is conveyed to a heat exchanger through a water outlet pipe; and in the step of exchanging heat and generating power by the heat exchange device, heat is exchanged with the working medium water by the heat exchanger to generate power.

Compared with the prior art, the present invention has the following advantages.

1. When the stratum coal is grinded into coal slurry under the ground by the directional slurry preparing drill, and the coal slurry is conveyed to the ground surface and then conveyed to the bottom of the vertically buried pipe at a vertical depth of blew 2200 m, at a temperature of above 400° C., the coal slurry is in a supercritical hydrothermal combustion state. Organic hydrocarbon substances are oxidized and combusted to release heat, and other harmful components are converted into harmless gases such as $N_2$ and $CO_2$ and inorganic salt particles. When the water flow obtained after the supercritical hydrothermal reaction is circulated to the wellhead, the heat energy is released through heat exchange and power generation, so that the heat energy conversion is realized.

2. By the super-oxidation capability obtained after the mid-deep ground source well is in the supercritical hydrothermal state, the organic hydrocarbon compounds are oxidized and combusted. As a result, heat is generated, and organic pollutants contained in water are decomposed harmlessly. The organic pollutants contained in water are oxidized and decomposed into carbon and hydrogen molecules harmlessly. When the waste water is rich in hydrocarbon compounds, the waste water is conveyed from the wellhead on the ground surface to the end through a gas pipe along the inner pipe wall and then combusted without flame/with flame by electrothermal ignition. The temperature of the waste water rises, and the waste water returns to a power generation and heat exchange device at the wellhead through another passageway to realize the conversion and release of the heat energy. The water is purified, filtered and introduced into a treated water recycling system. The whole process is carried out in an enclosed manner without secondary pollution and emission of harmful substances, thus completing one process of producing and outputting energy and serving regional building groups in an actively-adjustable or passively-adjustable optimization manner.

3. Clean water, obtained by purification and separation of water, is returned to the directional drilling machine for circulating for slurry preparation, and the separated inorganic salt particles and $CO_2$ in the gas are pressed back to a mined-out area for permanent storage. In this way, the harmless in-place utilization of stratum coal is realized.

in which:

1: water inlet pump; 2: coal slurry pump; 2a: gas-entrapping mixer; 3: directional slurry preparing drill; 4: vertically buried pipe; 5: heat-insulating inner pipe; 6: microporous pipe assembly; 7: electric heater; 8: water outlet pipe; 9: heat exchanger; 10: first microporous pipe; 11: second microporous pipe; 12: water inlet pipe; 13: composite single-wall pipe; 14: steam turbine; 15: power generator; 16: variable power distribution cabinet; 17: power wire; 18: cooler; 19: circulating cooling pipeline; 20: working medium water circulating pump; 21: water purification filter; 22: slag extractor; 23: slag pool; 24: pressure-stabilized gas distributor; 25: gas compressor; 26: $CO_2$ tank; 27: liquid conveying pump; 28: gas-solid mixer; 29: slag conveying pump; 30: vertical slag liquid conveying pipe; 31: directional slag discharge portion; 32: plastic capsule making machine; 33: vertically buried sleeve; 34: gas heat exchanger; 35: natural gas mixer; 100: stratum coal storage area; and, 101: mined-out area.

DETAILED DESCRIPTION OF THE INVENTION

Embodiment 1

Figure 1:
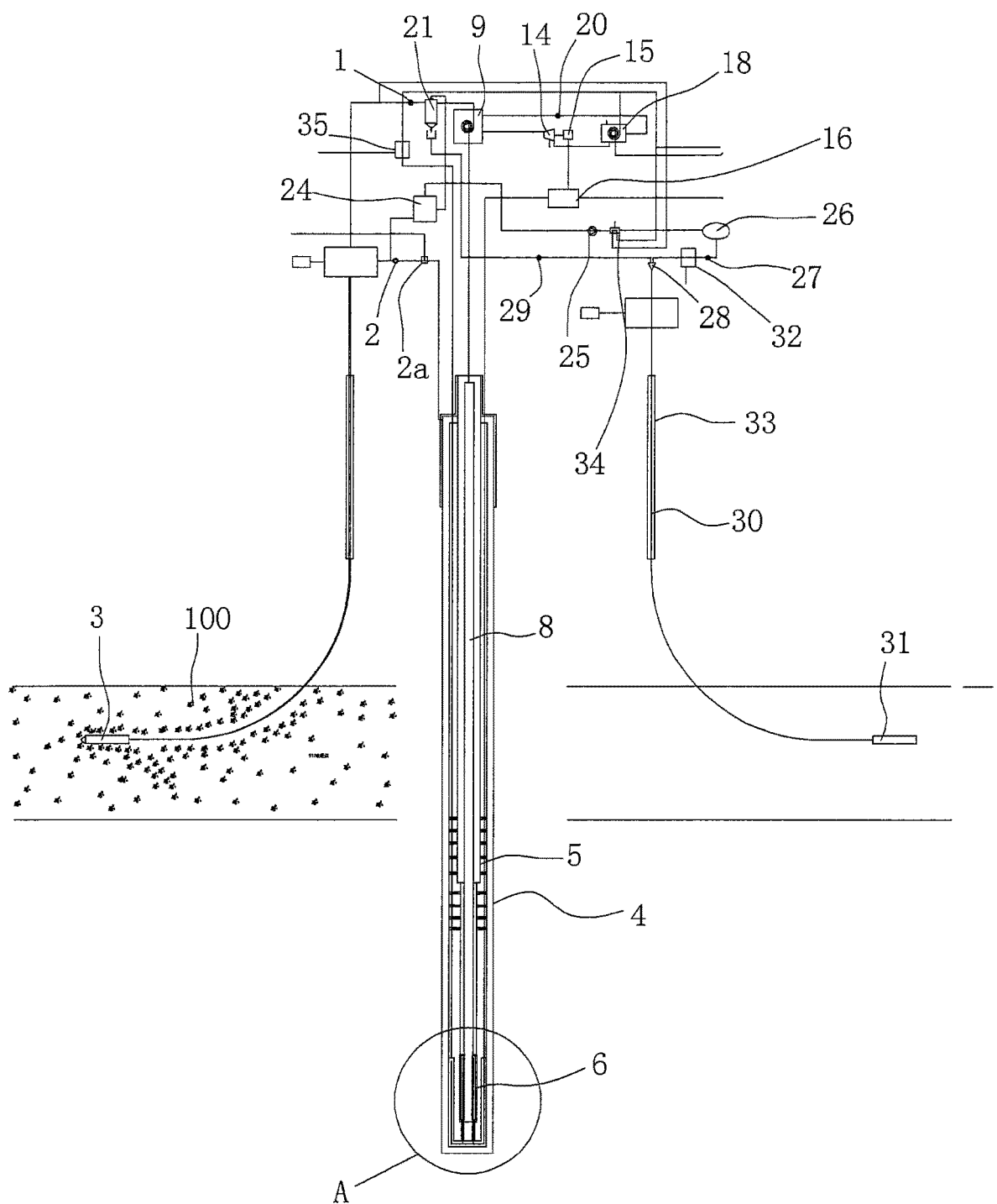
FIG. 1 is a planar structure diagram of the present invention.

As shown in FIG. 1, this embodiment provides a system for supplying heat by means of stratum coal in-place slurrying, including a stratum coal slurrying device, a mid-deep well casing device, a heat exchange device, a power generation device, a slag-water purification, filtration and separation device, a gas separation, compression and liquefaction device, and a slag liquid backfilling device.

Figure 2:
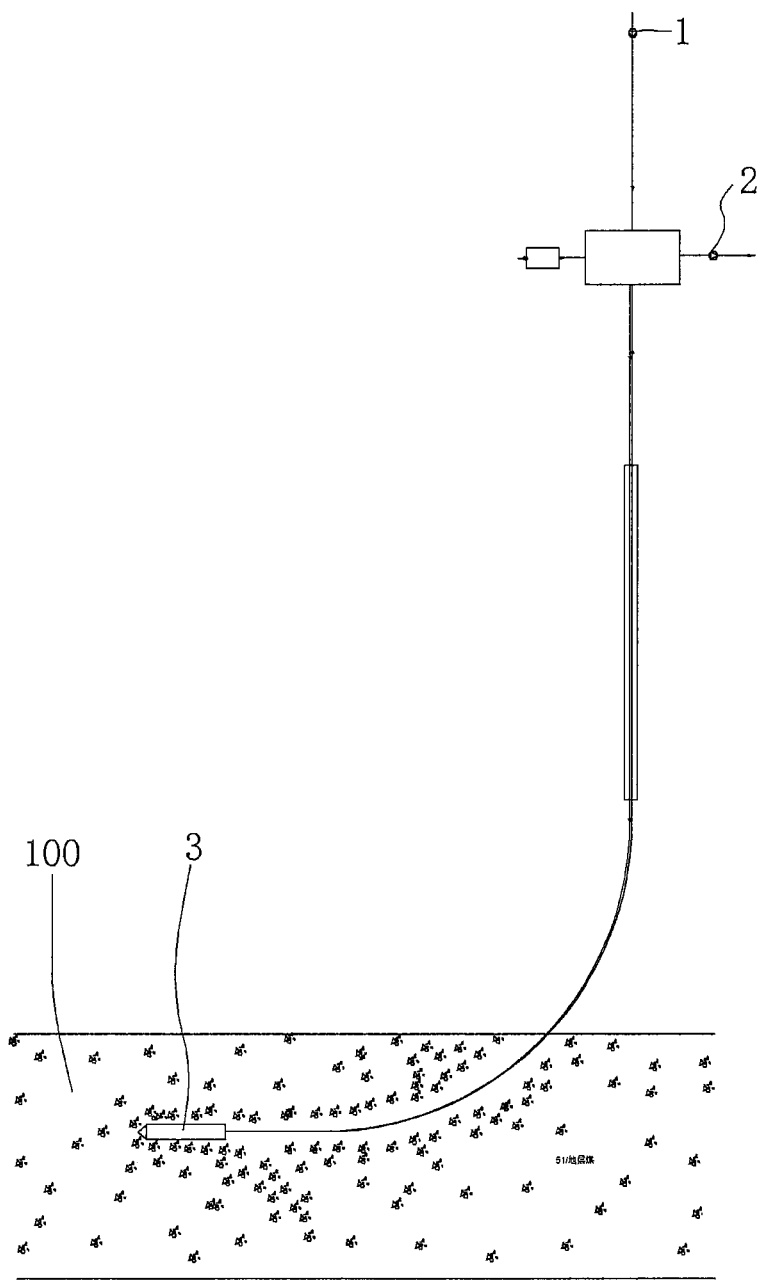
FIG. 2 is a schematic structure diagram of a stratum coal slurrying device.

With reference to FIG. 2, the stratum coal slurrying device includes a water inlet pump 1 and a coal slurry pump 2, which are connected to a directional slurry preparing drill 3 through pipelines, respectively.

Figure 3:
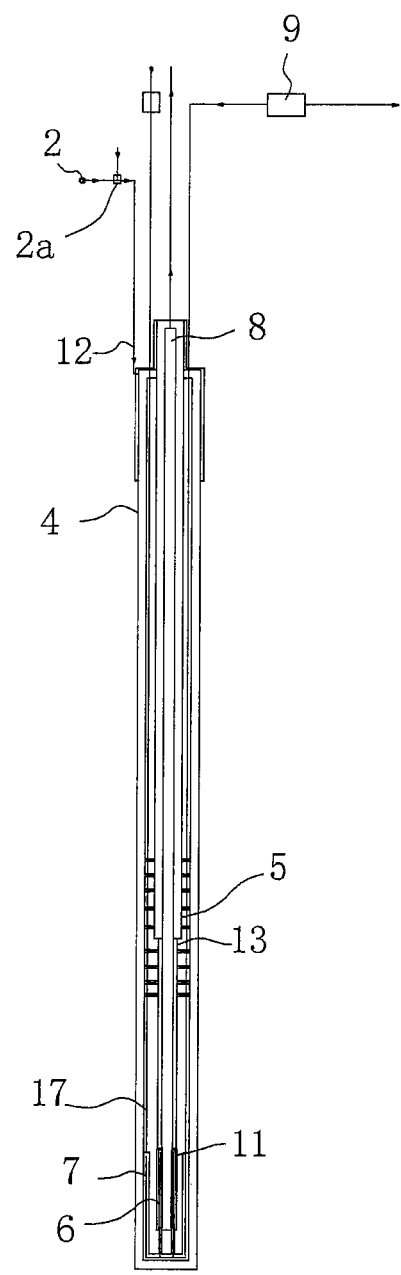
FIG. 3 is a schematic structure diagram of a mid-deep well casing device.
Figure 8:
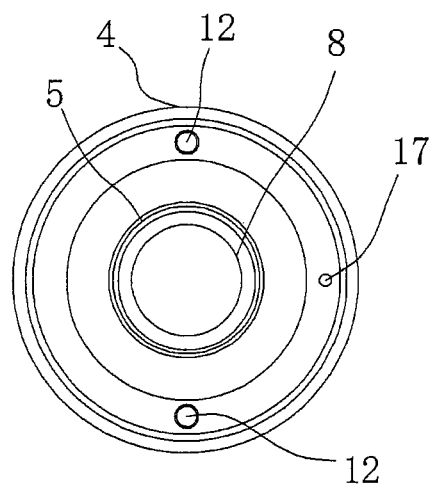
FIG. 8 is a sectional view of the mid-deep well casing device.
Figure 9:
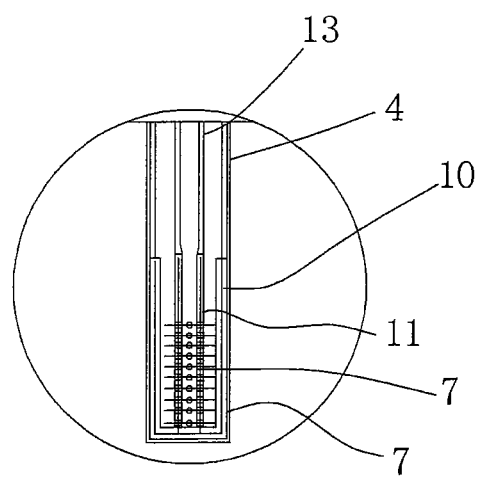
FIG. 9 is an enlarged view of part A of FIG. 1.

With reference to FIGS. 3, 8 and 9, the mid-deep well casing device includes a vertically buried pipe 4 and a heat-insulating inner pipe 5 that is coaxial with the vertically buried pipe 4 and inserted into the vertically buried pipe 4. A microporous pipe assembly 6 is arranged on the bottom of the heat-insulating inner pipe 5. Electric heaters 7 are arranged in the microporous pipe assembly 6. An annular cavity is formed between the vertically buried pipe 4 and the heat-insulating inner pipe 5. A power wire 17 connected to the electric heaters 7 is arranged in the annular cavity. The coal slurry pump 2 is connected to the annular cavity.

Figure 4:
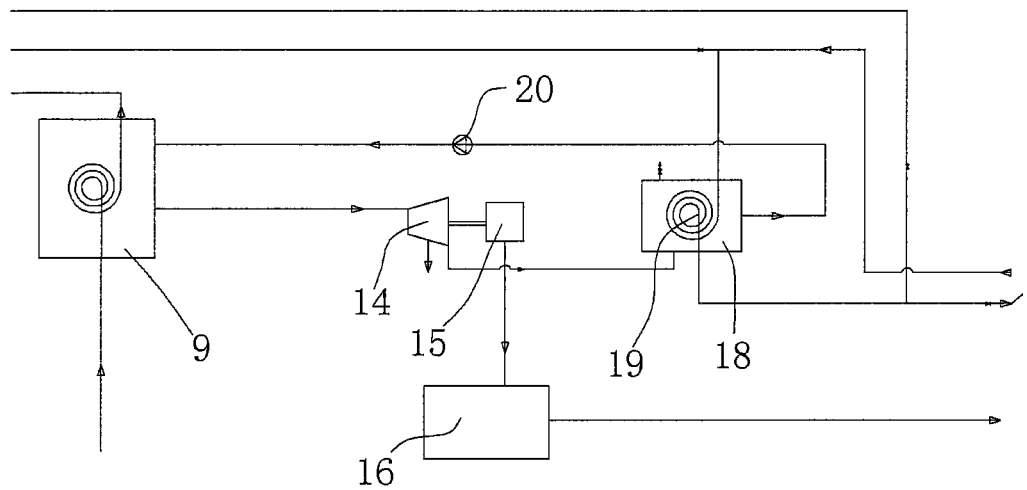
FIG. 4 is a schematic structure diagram of a power generation device.

With reference to FIGS. 3 and 4, the heat exchange device includes a water outlet pipe 8 that is inserted into the heat-insulating inner pipe 5 and connected to the microporous pipe assembly 6. The water outlet pipe 8 is connected to a heat exchanger 9, and the heat exchanger 9 is connected to the power generation device.

With reference to FIG. 4, the power generation device includes a steam turbine 14 connected to the heat exchanger 9. The steam turbine 14 is connected to a power generator 15, and the power generator 15 is connected to a variable power distribution cabinet 16. The variable power distribution cabinet 16 is connected to a municipal power grid and the power wire 17, respectively. The steam turbine 14 is also connected to a cooler 18. A circulating cooling pipeline 19 is arranged in the cooler 18. The cooler 18 is connected to the heat exchanger 9 through a working medium water circulating pump 20.

Figure 7:
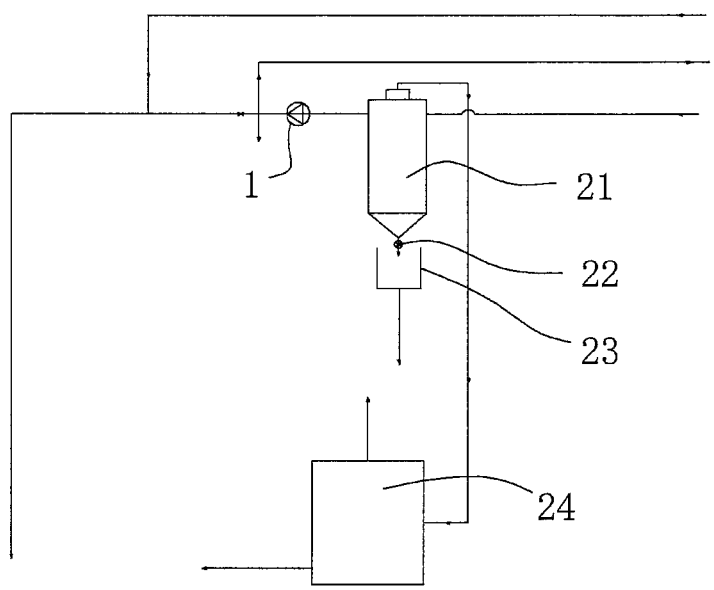
FIG. 7 is a schematic structure diagram of a slag-water purification, filtration and separation device.

With reference to FIG. 7, the slag-water purification, filtration and separation device includes a water purification filter 21 connected to the heat exchanger 9. A slag extractor 9 and a slag pool 23 are arranged on the bottom of the water purification filter 21. A water outlet of the water purification filter 21 is connected to the water inlet pump 1. The top of the water purification filter 21 is connected to the gas separation, compression and liquefaction device through a pipeline.

Figure 5:
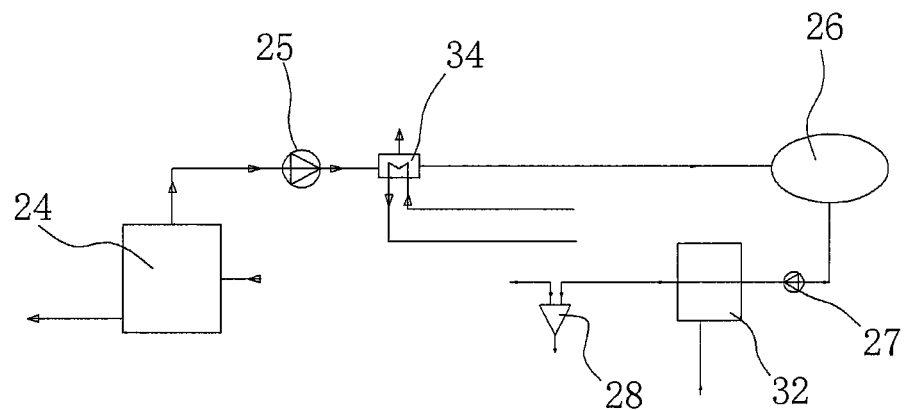
FIG. 5 is a schematic structure diagram of a gas separation, compression and liquefaction device.

With reference to FIG. 5, the gas separation, compression and liquefaction device includes a pressure-stabilized gas distributor 24 connected to the water purification filter. The pressure-stabilized gas distributor 24 is connected to a coal slurry pump 2 and a gas compressor 25. The gas compressor 25 is connected to a $CO_2$ tank 26. The $CO_2$ tank 26 is connected to a gas-solid mixer 28 through a liquid conveying pump 27. The slag pool 23 is connected to the gas-solid mixer 28 through a slag conveying pump 29. The gas-solid mixer 28 is connected to a slag liquid backfilling device.

Figure 6:
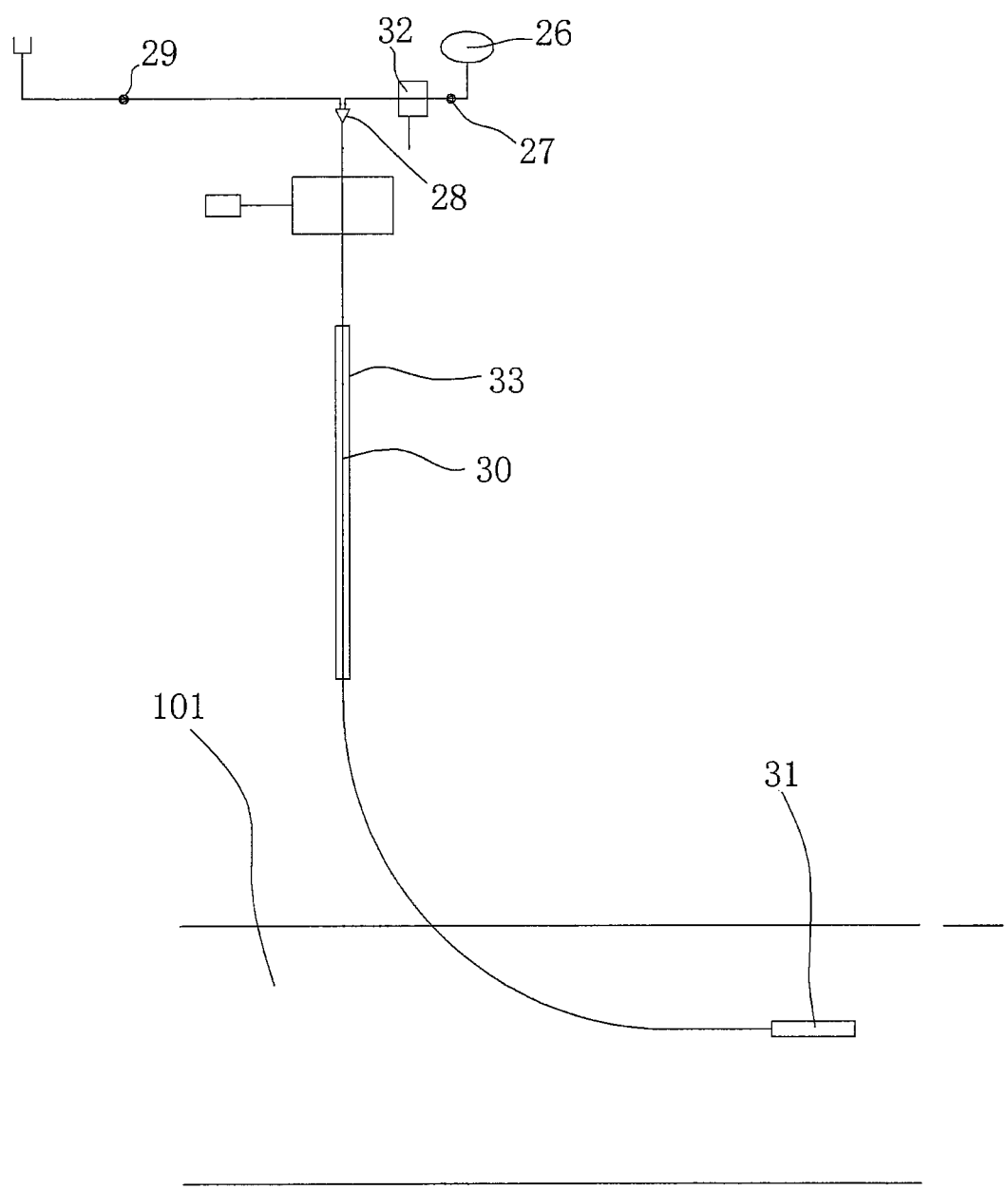
FIG. 6 is a schematic structure diagram of a slag liquid backfilling device.

With reference to FIG. 6, the slag liquid backfilling device includes a vertical slag liquid conveying pipe 30 connected to the gas-solid mixer 28, and a directional slag discharge portion 31 connected to the vertical slag liquid conveying pipe 30.

With reference to FIGS. 8 and 9, the microporous pipe assembly 6 comprises a first microporous pipe 10 and a second microporous pipe 11 that are coaxial with each other, and the electric heaters 7 are arranged in the first microporous pipe 10 and the second microporous pipe 11, respectively.

Both the first microporous pipe 10 and the second microporous pipe 11 are microporous ceramic pipes. A water inlet pipe 12 connected to the first microporous pipe is arranged in the annular cavity between the vertically buried pipe 4 and the heat-insulating inner pipe 5. The system further includes a composite single-wall pipe 13, two ends of which are hermetically connected to the top of the second microporous pipe 11 and the bottom of the heat-insulating inner pipe 5, respectively. The top of the heat-insulating inner pipe 5 is hermetically connected to the water outlet pipe 8. The heat-insulating inner pipe 5 is a three-layer pipe having two hollow interlayers.

A plastic capsule making machine 32 is arranged between the liquid conveying pump 27 and the gas-solid mixer 28, and a vertically buried sleeve 33 is sheathed outside the vertical slag liquid conveying pipe 30.

A gas heat exchanger 34 is arranged between the gas compressor 25 and the $CO_2$ tank 26. The water inlet pump 1 is also connected to a water inlet of the gas heat exchanger 34. A water outlet of the gas heat exchanger 34 is connected to an outlet of the water inlet pump 1.

An outlet of the water inlet pump 1 is also connected to a natural gas mixer 35, and the natural gas mixer 35 is connected to the water inlet pipe 12. The outlet of the coal slurry pump 2 is connected to a gas-entrapping mixer 2a, and the natural gas is mixed with the coal slurry in the gas-entrapping mixer 2a.

The operating principle of the present invention will be described below.

The water inlet pulp 1 is connected to a water supply pipe, and connected to the directional slurry preparing drill 3 through a port of a clean water inlet pipe. In an underground coal storage area, the coal bed is continuously cut and grinded into coal slurry having a particle size of 100 to 200 μm along a specified route by a hydraulic mechanical drill, and the coal slurry is returned to the ground surface along a slurry return pipe under the driving of the coal slurry pump 2.

The depth of the vertically buried pipe 4 is greater than 2200 m. The water inlet pipe 12 connected to the coal slurry pump 2 is arranged in the annular cavity enclosed by the heat-insulating inner pipe 5 in the vertically buried pipe 4. When a water flow containing 5% to 20% of coal slurry and dissolved oxygen/natural gas is pumped to an annular passageway between the inner side of the buried pipe and the outer side of the inner pipe, in an initial starting stage, the bottommost coal slurry is already at a pressure greater than 22 MPa and heated to above 400° C. by the electric heaters. At this time, the coal slurry will undergo supercritical oxidation, combustion and heat-release. By taking pressure of 28 MPa and temperature of 450° C. as an example, the dielectric constant is 1.8, the density is 0.128, the viscosity coefficient is 0.0298, the particle Reynolds number is 553, the diffusion coefficient is $7.67 \times 10^{-4}$, the oxygen solubility is infinite, and the organic substances are combusted without smoke and converted into $N_2$, $CO_2$ and inorganic solid harmless particles.

The main thermochemical process is as follows:

First stage: gasification, i.e., an anaerobic/aerobic low-temperature and low-pressure stage; conditions: 2-20 MPa, 150-350, 15-120 min, oxidation rate>70%.

Second stage: oxidation, i.e., an aerobic oxidation and heat release stage; conditions: 23-30 MPa, 400-600° C., ≤1 min, oxidation rate>99%.

Third stage: flame combustion, i.e., an aerobic flame high-intensity oxidation, combustion and heat release stage; conditions: 30 MPa, 650° C., oxidation rate=100%.

The main physic-chemical process includes the following.

a. The oxidation mechanism of organic substances at the inlet: By adding $O_2$ in water, the active oxygen reacts with the weakest C—H bond to generate free radicals HO2-, HO2- then reacts with H in the organic substance to generate H2O2, and $H_2O_2$ is further decomposed to hydroxyl (HO—). Due to its high activity, the HO— can almost react with all hydrogen-containing compounds.

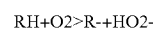

RH+O2>R-+HO2-

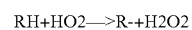

RH+HO2—>R-+H2O2

H2O2>2HO—

RH+HO—>R-+H2O

In the above reactions, the generated free radicals R— can react with $O_2$ to generate oxidized free radicals ROO—, and the oxidized free radicals ROO— further reacts with hydrogen atoms to generate peroxides:

R-+O2>ROO—

ROO-+RH>ROOH+R—

Due to their instability, the peroxides will usually be decomposed to compounds with smaller molecules until formic acid, acetic acid or the like are formed. Formic acid or acetic acid is finally converted into $CO_2$ and $H_2O$ through the free radicals ROO— oxidation process. NH3, NO3, >N2O>catalyst+heating>N2 b. Water containing organic hydrocarbon compounds at the inlet:

coal slurry, wherein, when the flow is 10 $M^3$/h to 35 $M^3$/h and the mass concentration is 5% to 20%, the heat energy is output to the outside in addition to maintaining the temperature of the system by self-heating.

c. The reaction of the supercritical water at the lower end of the well:

A non-polar solvent with high diffusibility and low viscosity can mutually soluble with many organic substances (e.g., pentane, hexane, methylbenzene, etc.) and gases (e.g., oxygen, etc.) in any proportion to form a single homogeneous oxidation system. However, the inorganic substances (particularly salts) are low in solubility and easily collected after precipitation. The characteristics are as follows: the reaction rate is high; the reaction time is short (<1 min); the oxidation efficiency of organic substances is above 99%; carbon oxides can be finally oxidized into $CO_2$ and $H_2O$; the organic substances containing nitrogen are oxidized into $N_2$, $N_2O$ and the like; and, the elements such as chlorine, sulfur and phosphorus are converted into inorganic salts and deposited in the supercritical water. Due to the relatively low reaction temperature (compared with incineration), no NOx and $SO_2$ will be formed.

d. The heat energy and water quality conditions of the outlet water at the wellhead:

a temperature of water of 200° C. to 300° C., containing 1% to 10% of inorganic salt solid particles, and containing gases $CO_2$ and $N_2$.

e. The energy conversion conditions of the thermal power generation device at the wellhead:

a water flow of 10 to 35 $M^3$/h, a power generation temperature difference of 150° C. to 250° C., a thermoelectric conversion efficiency of 0.4, and a generated power of 1500 to 5000 kw.

f. The heat supply, utilization and conversion conditions at the wellhead:

supplying 2000 to 7000 KW heat to the outside at three temperatures 130° C./90° C./45° C.

g. The drainage and water quality conditions of the outlet water at the wellhead:

the outlet water, filtered by filters with different precisions, is drained; it is sterile, non-toxic and pollution-free; the standards for surface water drainage are met; the temperature of water is 20° C. to 30° C.; and a small amount of $CO_2/N_2$ is contained.

The water outlet pipe 8 conveys the hot water obtained by combustion to the heat exchanger 9. The temperature of water at the outlet is 200° C. to 400° C. At the end of the heat exchange by the heat exchanger, water steam is generated by the circuit on the power generation side to facilitate the steam turbine to operate for power generation, where the net power generation efficiency is 40% to 50%. The waste steam is condensed into water in a condenser, and then pumped to the heat exchanger for circulation. The generated current is conveyed to the municipal power grid through the variable power distribution cabinet. As a scheme for efficiently utilizing thermoelectricity, the condensed water and the intermediate steam from the steam turbine can additionally provide heat output to the outside.

The slag-containing and gas-containing water, obtained by heat release and temperature reduction by the heat exchanger 9, is conveyed into the water purification filter 21 through a slag-water inlet to remove inorganic salt solid particles, and then pressurized and conveyed to the next link by the pump through the clean water outlet. The steam-water mixture in the upper portion of the purified water side in the upper portion of the water purification filter 21 is passed to the pressure-stabilized gas distributor 24 so that the gas contained in the water is separated and discharged to the gas compressor 25.

The water separated by the pressure-stabilized gas distributor 24 is drained to the inlet of the clean water pump and introduced into the main clean water flow, and the inorganic salt solid particles separated by the water purification filter 21 are discharged to the slag pool 23 by the slag extractor 22.

The mixed gas separated by the pressure-stabilized gas distributor 24 is passed to the gas compressor 25 through the pipeline and then compressed to above 7.5 MPa, cooled to liquid $CO_2$ by the cooling water in the cooler, and stored in the $CO_2$ tank 26. The liquid $CO_2$ may be output by the liquid conveying pump 27. During the cooling process, the non-condensable gas, including $N_2$, is exhausted by an exhaust pipe or otherwise utilized.

The operating condition of the directional slag discharge portion 31 is as follows: there is a coal mine-out area at a depth of more than 800 m under the ground. The water flow containing inorganic salt particles from the slag pool 23 is pressurized to above 8.0 MPa by the slag conveying pump 29, the $CO_2$ liquid flow from the $CO_2$ tank 26 is pressurized to above 8.0 MPa by the liquid conveying pump 27 and wrapped by PP capsules in 5 to 10 mm on the plastic capsule making machine. Then, the capsules and the slag flow are mixed in the gas-solid mixer 288, and discharged to a directional slag outlet through a slag injection pipe of the directional slag discharge portion 31. In a mined-out area at a depth of more than 800 m, when the static pressure of the water-bearing stratum is greater than 8.0 MPa, the $CO_2$ capsules will coexist with the inorganic salt particles in a liquid form, and the inorganic salt particles can be filled all over the mined-out area.

Embodiment 2

In accordance with the system for supplying heat by means of stratum coal in-place slurrying in Embodiment 1, this embodiment provides a method for supplying power generation heat by means of stratum coal in-place slurrying, including: a step of in-place preparing slurry by the stratum coal slurrying device, a step of combusting coal slurry by the mid-deep well casing device, and a step of exchanging heat and generating power by the heat exchange device.

In the step of in-place preparing slurry by the stratum coal slurrying device, water is conveyed to the directional slurry preparing drill 3 by the water inlet pump 1, the coal bed in the stratum coal storage area 100 is cut and grinded into coal slurry having a particle size of 100 to 200 μm by the directional slurry preparing drill 3, and the coal slurry is conveyed to the ground surface by the coal slurry pump 2.

In the step of combusting coal slurry by the mid-deep well casing device, the coal slurry having particle size of 100 to 200 µm is injected into the annular cavity between the vertically buried pipe 4 and the heat-insulating inner pipe 5, the electric heaters 7 heat the microporous pipe assembly 6 to raise the temperature of water near the microporous pipe assembly 6 to above 400° C. so that the coal slurry undergoes thermal oxidation reaction, the coal slurry 2 is continuously fed, and the reacted hot water is conveyed to the heat exchanger 9 through the water outlet pipe 8.

In the step of exchanging heat and generating power by the heat exchange device, heat is exchanged with the working medium water by the heat exchanger 9 to generate power, the working medium obtained after the heat exchange drives the steam turbine 14 to generate power through the power generator 15, the power is transferred to the municipal power grid and the power wire 17 through the variable power distribution cabinet 16, and the electric heaters 7 are heated by the power wire 17. Accordingly, the heat energy conversion and the cyclic utilization of heat energy are realized.

The water, after the heat exchange by the heat exchanger 9, is passed to the water purification filter 21 for purification and solid-liquid separation, and the purified water is conveyed into the directional slurry preparing drill 3 through the water inlet pump 1, so that the cyclic utilization of water is realized.

The natural gas is mixed with the coal slurry in the gas-entrapping mixer 2a and then passed to between the vertically buried pipe 4 and the heat-insulating inner pipe 5. When the electric heaters 7 heat the microporous pipe assembly 6 to raise the temperature of water near the microporous pipe assembly 6 to above 400° C., the natural gas is ignited to assist combustion.

After the top of the water purification filter 21 is connected to the pressure-stabilized gas distributor 24, the gas is compressed by the gas compressor 25, stored in the $CO_2$ tank 26, and recycled to obtain liquid $CO_2$.

The slag pool 23 is arranged on the bottom of the water purification filter 21, the slag conveying pump 29 is connected to the gas-solid mixer 28, the liquid $CO_2$ is conveyed to the gas-solid mixer 28 through the liquid conveying pump 27, the gas-solid mixer 28 is connected to the directional slag discharge portion 31 through the vertical slag liquid conveying pipe 30, and the directional slag discharge portion 31 runs into the mined-out area 101 so that the solid slag backfilling is realized.

The specific embodiments described herein are merely for illustrating the spirit of the present invention. Those skilled in the art can make various modifications or supplements to the specific embodiments described herein or replace the specific embodiments described herein in a similar way, without departing from the spirit of the present invention or the scope defined by the appended claims.

Although the terms such as the water inlet pump 1, the coal slurry pump 2, the gas-entrapping mixer 2a, the directional slurry preparing drill 3, the vertically buried pipe 4, the heat-insulating inner pipe 5, the microporous pipe assembly 6, the electric heater 7, the water outlet pipe 8, the heat exchanger 9, the first microporous pipe 10, the second microporous pipe 11, the water inlet pipe 12, the composite single-wall pipe 13, the steam turbine 14, the power generator 15, the variable power distribution cabinet 16, the power wire 17, the cooler 18, the circulating cooling pipeline 19, the working medium water circulating pump 20, the water purification filter 21, the slag extractor 22, the slag pool 23, the pressure-stabilized gas distributor 24, the gas compressor 25, the $CO_2$ tank 26, the liquid conveying pump 27, the gas-solid mixer 28, the slag conveying pump 29, the vertical slag liquid conveying pipe 30, the directional slag discharge portion 31, the plastic capsule making machine 32, the vertically buried sleeve 33, the gas heat exchanger 34, the natural gas mixer 35, the stratum coal storage area 100 and the mined-out area 101 are frequently used herein, other terms are possible. These terms are merely used for more conveniently describing and explaining the essence of the present invention, and the interpretation of the terms into any additional limitations shall be deviated from the spirit of the present invention.

The invention claimed is:

1. A system for supplying heat by means of stratum coal in-place slurrying, comprising a stratum coal slurrying device, a well casing device and a heat exchange device;
   the stratum coal slurrying device comprises a water inlet pump and a coal slurry pump, which are connected to a directional slurry preparing drill through pipelines, respectively;
   the well casing device comprises a vertically buried pipe and a heat-insulating inner pipe that is coaxial with the vertically buried pipe and inserted into the vertically buried pipe, with a microporous pipe assembly being arranged on a bottom of the heat-insulating inner pipe, electric heaters being arranged in the microporous pipe assembly, an annular cavity being formed between the vertically buried pipe and the heat-insulating inner pipe, a power wire connected to the electric heaters being arranged in the annular cavity, and the coal slurry pump being connected to the annular cavity; and
   the heat exchange device comprises a water outlet pipe that is inserted into the heat-insulating inner pipe and connected to the microporous pipe assembly, and the water outlet pipe is connected to a heat exchanger.

2. The system for supplying heat by means of stratum coal in-place slurrying according to claim 1, wherein the microporous pipe assembly comprises a first microporous pipe and a second microporous pipe that are coaxial with each other, and the electric heaters are arranged in the first microporous pipe and the second microporous pipe, respectively.

3. The system for supplying heat by means of stratum coal in-place slurrying according to claim 2, wherein both the first microporous pipe and the second microporous pipe are microporous ceramic pipes; a water inlet pipe connected to the first microporous pipe is arranged in the annular cavity between the vertically buried pipe and the heat-insulating inner pipe; the system further comprises a composite single-wall pipe, two ends of which are hermetically connected to a top of the second microporous pipe and a bottom of the heat-insulating inner pipe, respectively; and, a top of the heat-insulating inner pipe is hermetically connected to the water outlet pipe.

4. The system for supplying heat by means of stratum coal in-place slurrying according to claim 1, wherein the heat exchanger is connected to a power generation device; the power generation device comprises a steam turbine connected to the heat exchanger; the steam turbine is connected to a power generator; the power generator is connected to a variable power distribution cabinet; the variable power distribution cabinet is connected to a municipal power grid and a power wire, respectively; the steam turbine is also connected to a cooler; a circulating cooling pipeline is arranged in the cooler; and, the cooler is connected to the heat exchanger through a working medium water circulating pump.

5. The system for supplying heat by means of stratum coal in-place slurrying according to claim 4, wherein the heat exchanger is also connected to a slag-water purification, filtration and separation device; the slag-water purification, filtration and separation device comprises a water purification filter connected to the heat exchanger; a slag extractor and a slag pool are arranged on a bottom of the water purification filter; and, a water outlet of the water purification filter is connected to the water inlet pump.

6. The system for supplying heat by means of stratum coal in-place slurrying according to claim 5, wherein a top of the water purification filter is connected to a pressure-stabilized gas distributor through a pipeline; the pressure-stabilized gas distributor is connected to a coal slurry pump and a gas compressor; the gas compressor is connected to a $CO_2$ tank; the $CO_2$ tank is connected to a gas-solid mixer through a liquid conveying pump; the slag pool is connected to the gas-solid mixer through a slag conveying pump; the gas-solid mixer is connected to a slag liquid backfilling device; and, the slag liquid backfilling device comprises a vertical slag liquid conveying pipe connected to the gas-solid mixer and a directional slag discharge portion connected to the vertical slag liquid conveying pipe.

7. The system for supplying heat by means of stratum coal in-place slurrying according to claim 6, wherein a plastic capsule making machine is arranged between the liquid conveying pump and the gas-solid mixer, and a vertically buried sleeve is sheathed outside the vertical slag liquid conveying pipe.

8. The system for supplying heat by means of stratum coal in-place slurrying according to claim 6, wherein a gas heat exchanger is arranged between the gas compressor and the $CO_2$ tank; the water inlet pump is also connected to a water inlet of the gas heat exchanger; and, a water outlet of the gas heat exchanger is connected to an outlet of the water inlet pump.

9. The system for supplying heat by means of stratum coal in-place slurrying according to claim 3, wherein an outlet of the water inlet pump is also connected to a natural gas mixer, and the natural gas mixer is connected to the water inlet pipe.

10. A method for supplying power generation heat by means of stratum coal in-place slurrying by using a system for supplying heat by means of stratum coal in-place slurrying, the system comprising a stratum coal slurrying device, a well casing device and a heat exchange device; the stratum coal slurrying device comprises a water inlet pump and a coal slurry pump, which are connected to a directional slurry preparing drill through pipelines, respectively; the well casing device comprises a vertically buried pipe and a heat-insulating inner pipe that is coaxial with the vertically buried pipe and inserted into the vertically buried pipe, with a microporous pipe assembly being arranged on a bottom of the heat-insulating inner pipe, electric heaters being arranged in the microporous pipe assembly, an annular cavity being formed between the vertically buried pipe and the heat-insulating inner pipe, a power wire-connected to the electric heaters being arranged in the annular cavity, and the coal slurry pump being connected to the annular cavity; and the heat exchange device comprises a water outlet pipe that is inserted into the heat-insulating inner pipe and connected to the microporous pipe assembly, and the water outlet pipe is connected to a heat exchanger, the method comprising: a step of in-place preparing slurry by the stratum coal slurrying device, a step of combusting coal slurry by the well casing device, and a step of exchanging heat and generating power by the heat exchange device, wherein:

in the step of in-place preparing slurry by the stratum coal slurrying device, water is conveyed to the directional slurry preparing drill by the water inlet pump, a coal bed in an underground coal storage area is cut and grinded into coal slurry having a particle size of 100 to 200 μm by the directional slurry preparing drill, and the coal slurry is conveyed to the ground surface by the coal slurry pump;

in the step of combusting coal slurry by the well casing device, the coal slurry having particle size of 100 to 200 μm is injected into the annular cavity between the vertically buried pipe and the heat-insulating inner pipe, electric heaters heat the microporous pipe assembly to raise the temperature of water near the microporous pipe assembly to above 400° C. so that the coal slurry undergoes thermal oxidation reaction, the coal slurry pump is continuously fed, and reacted hot water is conveyed to the heat exchanger through the water outlet pipe; and in the step of exchanging heat and generating power by the heat exchange device, heat is exchanged with working medium water by the heat exchanger to generate power.

* * * * *